Aug. 20, 1963   L. E. HERR   3,101,126
VEHICLE POWER TRANSMISSION UNIT MOUNTING
Filed Dec. 13, 1960   3 Sheets-Sheet 2
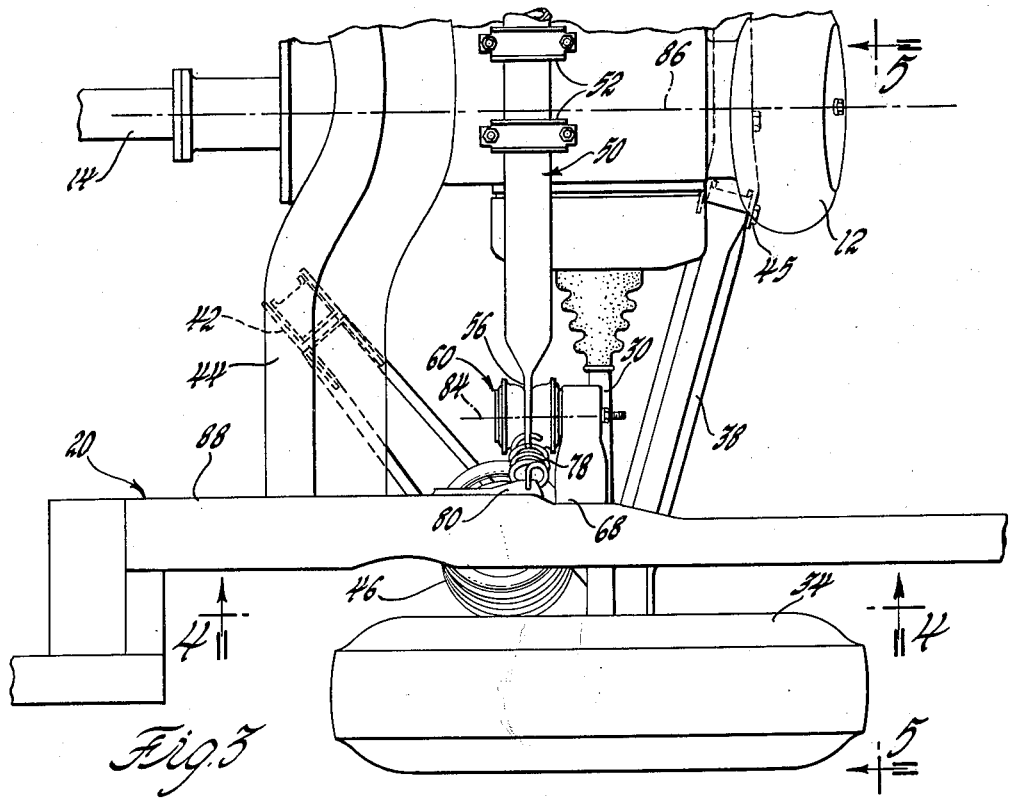
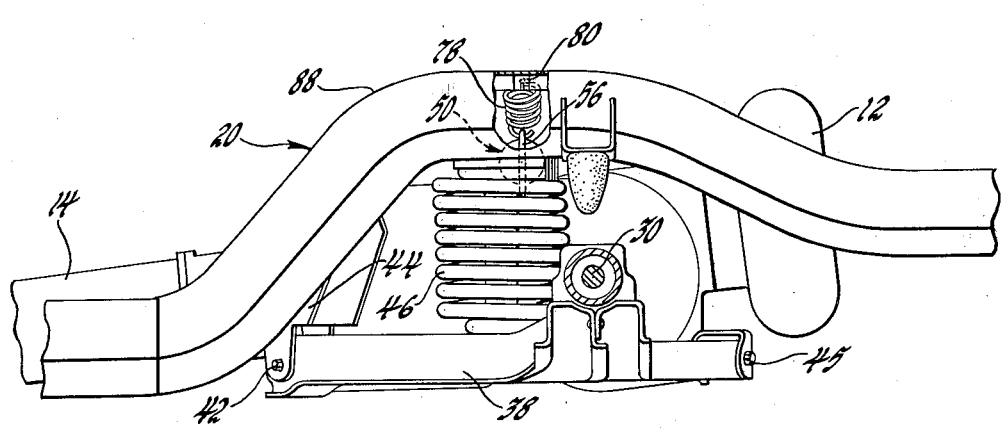
INVENTOR.
Lewis E. Herr
BY
D. D. McGraw
ATTORNEY Aug. 20, 1963 L. E. HERR 3,101,126
VEHICLE POWER TRANSMISSION UNIT MOUNTING
Filed Dec. 13, 1960 3 Sheets-Sheet 3
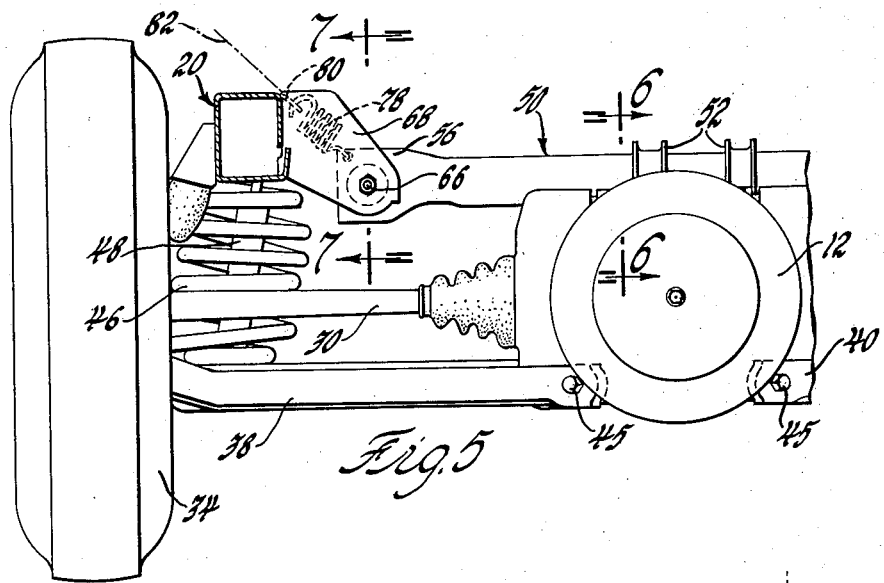
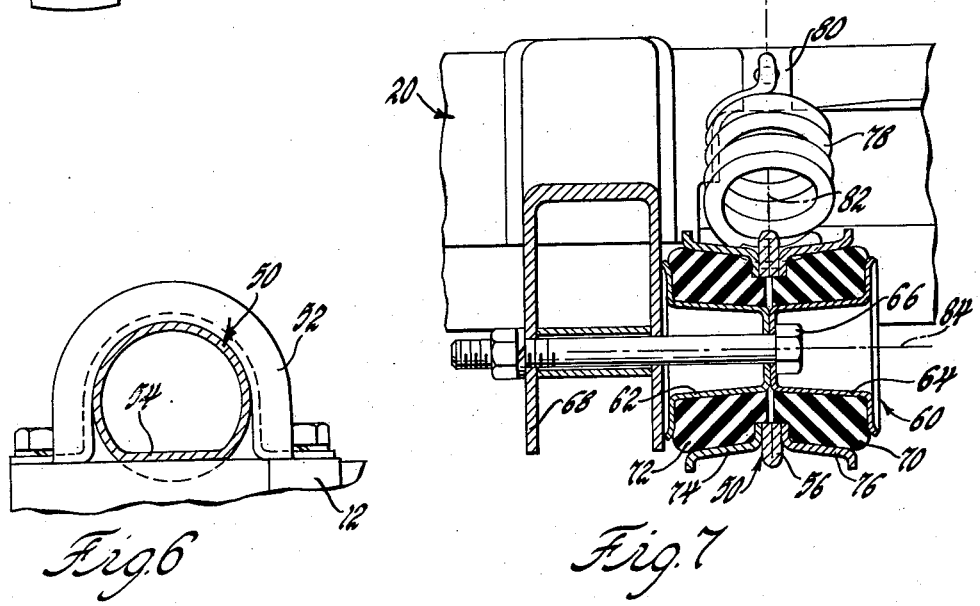
INVENTOR.
Lewis E. Herr
BY
D. D. McGraw
ATTORNEY

United States Patent Office 3,101,126
Patented Aug. 20, 1963

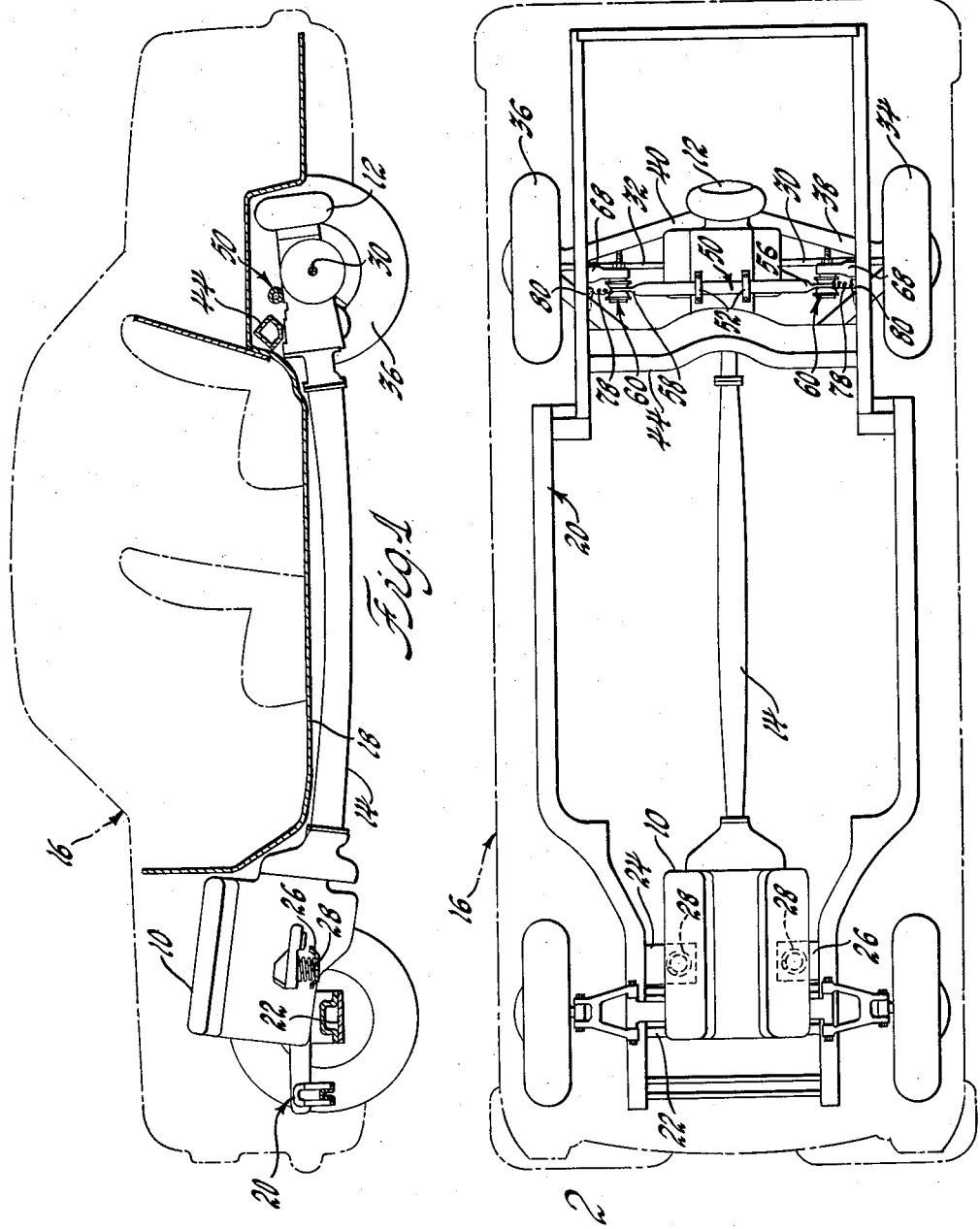
INVENTOR.
Lewis E. Herr
BY
D. D. McGraw
ATTORNEY

3,101,126
VEHICLE POWER TRANSMISSION UNIT
MOUNTING
Lewis E. Herr, Pontiac, Mich., assignor to General Motors
Corporation, Detroit, Mich., a corporation of Delaware
Filed Dec. 13, 1960, Ser. No. 75,538
4 Claims. (Cl. 180—64)

The invention relates to the mounting of a vehicle power package unit and more particularly to the mounting of units comprising an engine connected through a torque tube and drive shaft to a transaxle so that the engine, drive member and transaxle may be considered as a single unit. Vehicles of this type are disclosed in copending applications Serial No. 57,065, filed September 19, 1960, in the name of John Z. De Lorean, and entitled "Power Shaft," a continuation-in-part of Serial No. 676,-094, filed August 5, 1957, now abandoned; Serial No. 763,566, filed September 26, 1958, in the name of Hugh W. Larsen, and entitled "Shaft Vibration Dampening," now Patent No. 3,037,573; and Serial No. 684,892, filed September 19, 1957, in the name of Fred F. Timpner et al., and entitled "Dynamic Vibration Absorber," now Patent No. 3,056,312.

In conventional automotive vehicles the engine and transmission are usually mounted as a single unit in the forward end of the vehicle. A universal jointed drive shaft connects this unit to the differential and axle assembly located at the rear of the vehicle. The differential and axle assembly is separately mounted from the engine and transmission assembly. It is, therefore, common to use three or four engine-transmission mounts in the front of the vehicle and, likewise, to use several differential-axle mounts in the rear of the vehicle.

It is now proposed to mount the power transmission unit with two mounts adjacent the engine in the front of the vehicle and two mounts adjacent the transaxle assembly at the rear of the vehicle to provide a four-point mounting system. The front mounts may be provided with soft rate springs, to statically support the weight of the engine, and rubber or other similar mounting pads to absorb the dynamic forces. The rear mounts are also so constructed and arranged as to statically support the transaxle by springs and to dynamically support that unit by the use of rubber or other similar mounting pads. In particular, it is proposed to provide the static support springs for the transaxle at opposite ends of a transversely extending cross bar which is directly connected to the transaxle unit, the bar ends also being mounted intermediate oppositely disposed rubber biscuits which provide no static support but operate to absorb dynamic shock loads during vehicle operation.

In the drawings:
FIGURE 1 is a side elevation view of a vehicle embodying the invention and having the parts shown in section with the vehicle body outline being shown in phantom;
FIGURE 2 is a plan view of the vehicle of FIGURE 1;
FIGURE 3 is an enlarged plan view of a portion of the rear mounting system embodied in the vehicle of FIGURE 1, with parts broken away;
FIGURE 4 is a side elevation view of the structure illustrated in FIGURE 3 and taken in the direction of arrows 4—4 of that figure;
FIGURE 5 is a rear elevation view of the structure of FIGURE 3 with parts broken away and in section, and is taken in the direction of arrows 5—5 of that figure;
FIGURE 6 is a partial section view taken in the direction of arrows 6—6 in FIGURE 5; and
FIGURE 7 is a partial section view taken in the direction of arrows 7—7 of FIGURE 5.

As is explained in greater detail in the above-noted applications, it is desirable to provide a vehicle having the engine mounted in the front thereof and the transmission mounted in the rear thereof and interconnected by a drive shaft passing underneath the vehicle with the drive shaft being enclosed in a torque tube solidly secured at either end to the engine and transaxle units, respectively. In the vehicle illustrated in the drawings, the engine 10 is connected to the transaxle 12 by a torque tube 14 through which a drive shaft extends for delivering power from the engine to the transaxle unit. Details of this construction are illustrated in the above-noted applications and reference may be made to those applications for a better understanding of this drive system. The disclosures of these applications are, therefore, incorporated herein by reference. The vehicle 16 may be provided with a body 18 which may be either of the integral body-frame type or the separate body and frame type. In either instance a frame 20 of a desirable nature is provided. The front vehicle suspension system may be mounted on a front cross member 22 which is secured to the frame 20. Engine mounting brackets 24 and 26 may be provided on the front cross member 22 with one such bracket being provided on each side of the engine. Soft rate front mounting springs 28 are provided to statically support the engine on the brackets 24 and 26. The engine is thus mounted at two mounting points in the engine compartment of the vehicle. These points are preferably so located adjacent the engine center of gravity that the engine is substantially balanced about these points.

The transaxle assembly 12 has drive axles 30 and 32 extending transversely therefrom and in a generally horizontal direction. These axles are respectively connected to wheels 34 and 36 in driving relationship. The drive shaft interconnecting the engine and the transaxle unit passes through torque tube 14 to transmit power to the axles 30 and 32. Wheels 34 and 36 are each provided with a suspension control arm 38 and 40, respectively. The forward ends of each control arm 38 and 40 are each pivotally mounted at 42 on a rear cross member 44 of the frame 20. The rear ends of the control arms are pivotally mounted at 45 to the transaxle assembly 12. The outer ends of the control arms are attached to the wheel assembly in any well known manner to permit proper suspension action. A vehicle suspension spring 46 and a shock absorber 48 are provided intermediate each control arm and a portion of the frame 20.

The transaxle assembly 12 is tightly secured to a support bar 50 by means of mounts 52. The support bar 50 may be circularly formed as from tubular stock. The under portion of the bar 50 which is in contact with the upper surface of transaxle 12 may be flattened, as shown at 54, to prevent turning of the support bar relative to the transaxle unit. Bar 50 extends transversely outward beyond the transaxle unit 12 to points adjacent but inboard of the side rails of the frame 20. The ends 56 and 58 of bar 50 are flattened so that they extend in a vertical plane. Each flattened end is received in a rubber mounting assembly 60. Each of these assemblies is formed of oppositely disposed cups 62 and 64 through the centers of which the bolt 66 is received, this bolt fastening the mounting assembly 60 to a mounting bracket 68 extending inwardly and downwardly from the side rail of the frame 20. Resilient biscuits or pads 70 and 72, which may be of rubber or other suitable material, are respectively received in cups 60 and 62. These biscuits are provided with annular grooves at their inner ends which cooperate to form an annular channel in which one end of support bar 50 is received. Outer cups 74 and 76 are provided about biscuits 70 and 72 and are secured at their inner ends to opposite sides of the support bar end 56, as seen in FIGURE 7.

The upper and outer corner of each end 56 and 58 of support bar 50 is provided with an aperture in which one end of a tension-type static support spring 78 is received. The adjacent side rails 88 of the frame 20 are each provided with a suitable tab 80 in which an aperture is formed and through which the other end of each spring 78 is achieved. Each spring 78 is calibrated so that it will support half of the static load of the transaxle assembly when the spring is positioned at approximately a 45 degree angle, as best seen in FIGURE 5. In this position the axis 82 of spring 78 is substantially normal to the axes 84 and 86 of mounting assembling 60 and transaxle 12 as well as the longitudinal direction of the adjacent side rail 88 of frame 20. Springs 78 operate to relieve the rubber mounting assemblies 60 of the weight of the transaxle unit, and the rubber biscuits 70 and 72 only react when dynamic forces are exerted tending to move the transaxle unit 12 relative to the vehicle frame 20. Thus springs 78 and their adjacent mounting assemblies 60 transmit their respective forces in parallel relation.

In a system of this type the axis of minimum inertia of the power unit, sometimes referred to as the roll axis, extends substantially through the centers of gravity of the front-mounted engine 10 and the rear-mounted transaxle 12. The power unit is thus constructed somewhat similar to a "dumbbell." The roll axis is, therefore, substantially along the engine crankshaft axis which is also the torque axis of the unit. The torque applied by the engine, therefore, has substantially no vertical component which would otherwise cause pitch. The pitch axis is also moved rearwardly a substantial distance since it passes through the center of gravity of the overall unit. Pitch forces at the engine and transaxle, therefore, have lesser cumulative effects. The roll torque is taken up internally so the entire unit is balanced and permits a minimum spring force on the engine mounts. Any tendency to roll is absorbed particularly by the rear mounts because of the leverage available from bar 50. The low rate coil springs 28 provide relatively small spring forces in relation to the deflection obtained on either side of the center point of the engine. In order to provide substantial lateral control, suitable rubber bumpers, not shown, are provided to give a high resisting force per unit of deflection after the engine coil springs have been compressed a predetermined amount. It is to be understood that the entire power package unit forms a part of the sprung weight of the vehicle as distinguished from the usual construction where the rear axle and differential are ordinarily a part of the unsprung weight of the vehicle. Hence, the engine and clutch assembly, and the trans-axle assembly, being interconnected by a solid torque tube, form a unitized spring mass greatly simplifying the balancing problems in vehicle construction.

I claim:

1. In a motor vehicle having a frame and a power package unit comprising an engine resiliently mounted at one end of said vehicle to said vehicle frame and an axle unit resiliently mounted at the other end of said vehicle to said frame and means solidly interconnecting said engine and said axle unit whereby said engine and said axle unit constitute a unit power package, said axle unit resilient mounting means comprising a support bar extending laterally of and secured to said axle unit, a pair of static support tension springs respectively secured to the opposite ends of said support bar and extending to and connected with said vehicle frame and providing the entire static support for said axle unit, a pair of mounting brackets secured to said frame and extending parallel to and adjacent said static support springs, a pair of rubber mounting assemblies respectively secured to said mounting brackets and the respective ends of said support bar adjacent the points of attachment of the static support springs to said support bar and providing only dynamic force-absorbing means for resisting only dynamic forces transmitted between said vehicle frame and said axle unit.

2. In a motor vehicle having a frame, a mechanism resiliently supported on said frame and means for so supporting said mechanism, said means comprising a laterally extending support bar secured to said mechanism and a static support tension spring extending angularly upwardly and outwardly from said support bar and connecting said support bar and said frame to statically support said mechanism on said frame, and a rubber mounting assembly for resisting only dynamic forces exerted between said mechanism and said spring, said rubber mounting assembly comprising a first pair of oppositely disposed cups and resilient rubber means secured to said cups on the outer sides thereof and a second pair of cups secured on the outer periphery of said rubber mounting means, said first pair of cups being tightly secured to said frame and said second pair of cups being tightly secured to said support bar whereby said rubber mounting means provides only dynamic support of said mechanism.

3. In a motor vehicle having a frame, a power package unit forming a part of the sprung weight of the vehicle supported from the frame and comprising an engine and a transaxle interconnected by a torque tube and a drive shaft interconnecting said engine and transaxle for power transmission therebetween, the improvement comprising; a four point mounting system for interconnecting the power package unit and frame including, a first pair of laterally disposed power packaged mounts on the frame opposite the engine, a second pair of laterally disposed power package mounts on the frame opposite the transaxle, a transaxle support bar mounted between the second pair of mounts and carrying the rear of the power package unit, said first pair of mounts comprising low rate resilient means and said second pair of mounts each comprising a static resilient support means and an independent dynamic-force absorbing means both being connected to the end of the support bar in parallel force-transmitting relation acting substantially normal to the roll axis of the power package unit whereby maximum stability along the roll axis is achieved.

4. In a motor vehicle having a frame, a power package unit forming a part of the sprung weight of the vehicle supported from the frame and comprising an engine and a transaxle solidly interconnected by a torque tube and a drive shaft interconnecting the engine and transaxle for power trasmission therebetween, the improvement comprising; a four point resilient mounting system for connecting the power package unit and the frame including a first pair of laterally disposed power package mounts on the frame opposite the engine, a second pair of laterally disposed power package mounts on the frame opposite the transaxle, a transaxle support bar mounted to the transaxle and extending laterally adjacent opposite portions of the vehicle frame, said second pair of power package mounts each comprising a pair of laterally projecting mounting brackets secured to the vehicle frame adjacent the ends of the bar, said bar and brackets each having adjacent overlapping flat surfaces, dynamic force absorbing means separating the overlapping flat surfaces and interconnecting the ends of the bar and the brackets, static support means connected between the ends of the bar and the adjacent portions of the vehicle frame and disposed at an angle substantially normal to the axis of the dynamic force absorbing means and the roll axis of the power package unit whereby maximum stability along the roll axis is achieved.

References Cited in the file of this patent

UNITED STATES PATENTS

| | | |
|---|---|---|
| 1,936,389 | Hallquist | Nov. 21, 1933 |
| 1,971,209 | Carpenter et al. | Aug. 21, 1934 |
| 2,084,080 | D'Aubarede | June 15, 1937 |
| 2,356,962 | Williams | Aug. 29, 1944 |
| 2,645,299 | Vincent | July 14, 1953 |
| 2,681,118 | Roller | June 15, 1954 |
| 2,910,131 | Krotz | Oct. 27, 1959 |

FOREIGN PATENTS

| | | |
|---|---|---|
| 208,243 | Austria | Mar. 25, 1960 |